US007001515B2

(12) United States Patent
Sawhill et al.

(10) Patent No.: US 7,001,515 B2

(45) Date of Patent: Feb. 21, 2006

(54) DUAL FILTER SYSTEM FOR FILTERING OF INJECTOR FLUIDS

(75) Inventors: Matthew P. Sawhill, Des Moines, IA (US); Daniel W. Pfeffer, West Des Moines, IA (US)

(73) Assignee: Townsend Engineering Company, Des Moines, IA (US)

( * ) Notice: Subject to any disclaimer, the term of this patent is extended or adjusted under 35 U.S.C. 154(b) by 265 days.

(21) Appl. No.: 10/684,779

(22) Filed: Oct. 14, 2003

(65) Prior Publication Data

US 2005/0077254 A1 Apr. 14, 2005

(51) Int. Cl.
*B01D 33/073* (2006.01)
*B01D 33/11* (2006.01)

(52) U.S. Cl. ...................... 210/255; 210/262; 210/391; 210/396; 210/402; 210/403; 210/784; 99/532

(58) Field of Classification Search ..................... None
See application file for complete search history.

(56) References Cited

U.S. PATENT DOCUMENTS

| | | | | |
|---|---|---|---|---|
| 1,343,505 A * | 6/1920 | Haug | 210/386 |
| 1,594,999 A * | 8/1926 | Carter | 210/393 |
| 1,755,336 A * | 4/1930 | Ryder | 209/296 |
| 2,185,408 A * | 1/1940 | Kettenbach | 366/225 |
| 2,294,179 A * | 8/1942 | Hawley et al. | 210/770 |
| 2,342,321 A * | 2/1944 | Adams | 210/784 |
| 2,664,204 A * | 12/1953 | Hurter | 210/403 |
| 3,347,379 A * | 10/1967 | Miller | 210/127 |
| 3,687,058 A | 8/1972 | Townsend | |
| 3,695,448 A * | 10/1972 | Johansson | 210/394 |
| 3,709,329 A * | 1/1973 | Mlodzinski | 209/634 |
| 3,876,548 A * | 4/1975 | Welles, Jr. | 210/391 |
| 3,922,364 A | 11/1975 | Townsend | |
| 3,979,289 A * | 9/1976 | Bykowski et al. | 210/784 |
| 4,115,271 A * | 9/1978 | Holt | 210/247 |
| 4,136,832 A * | 1/1979 | Morita et al. | 241/91 |
| 4,140,629 A * | 2/1979 | Martindale | 209/240 |
| 4,198,299 A * | 4/1980 | Ewing et al. | 210/784 |
| 4,218,322 A * | 8/1980 | Kojima | 210/391 |
| 4,306,975 A * | 12/1981 | Siewert | 210/394 |
| 4,392,421 A * | 7/1983 | Yano et al. | 99/524 |
| 4,507,202 A * | 3/1985 | Nord et al. | 210/391 |
| 4,620,478 A | 11/1986 | Corominas | |
| 4,857,180 A * | 8/1989 | Eriksson | 209/664 |
| 5,433,849 A | 7/1995 | Zittel | |
| 5,507,396 A * | 4/1996 | Hauch | 209/399 |
| 5,552,044 A * | 9/1996 | Abel | 210/252 |
| 5,587,073 A | 12/1996 | Zittel | |
| 5,603,846 A * | 2/1997 | Uchiyama et al. | 210/784 |
| 5,685,984 A * | 11/1997 | Smith | 210/402 |
| 5,798,039 A * | 8/1998 | Wiesemann | 210/232 |
| 5,858,218 A * | 1/1999 | Setlock et al. | 210/167 |
| 6,059,963 A * | 5/2000 | Horakova et al. | 210/143 |
| 6,227,379 B1 * | 5/2001 | Nesseth | 210/393 |
| 6,305,552 B1 * | 10/2001 | Coleman | 209/664 |
| 6,497,176 B1 | 12/2002 | Basile et al. | |
| 2005/0077254 A1 * | 4/2005 | Sawhill et al. | 210/784 |

* cited by examiner

*Primary Examiner*—Robert James Popovics

(57) ABSTRACT

A filtering system used on a meat injection machine that injects pickling into meat products. The filter consists of a tank and a first and second rotary filter. The first rotary filter uses a wedge wire wound cylinder and augers having flutes that rotate to catch and push away solid particles toward the second filter. The second filter then uses more wedge wire in a whirlpool effect to ensure all solid materials and foam are in the outside of the filter. Injector fluid is then taken from the center of the inside volume of the second filter to be used in injection needles.

16 Claims, 4 Drawing Sheets

DUAL FILTER SYSTEM FOR FILTERING OF INJECTOR FLUIDS

BACKGROUND OF THE INVENTION

During mechanical injection of meat products, pickling solution is injected into the meat through a multitude of hollow needles, which are repeatedly inserted into the meat to achieve a predetermined percentage addition of solution. Excess solution is collected in a tray beneath the product for use after filtration to remove meat particles.

Currently available filter systems usually consist of a wedge wire drum, which rotates slowly. The recovered solution runs over the outside of the drum causing liquids to pass between the wires into a tank while the solid particles are scraped off the outside of the drum as it rotates. The solution is then filtered through static filter screens before being pumped back to the needles.

Often some solution is transferred with the meat particles still in the solution. Furthermore, when filtration is not completely effective in removing particles from the injection pickle solution, the particles end up in the pickle solution that returns to the needles. This particle matter in the solution can cause clogging which has an adverse effect on the percentage injection rate. In addition, filters, particularly static screens, are prone to becoming clogged by the particles remaining in the solution. This causes the need for repeated cleaning to reduce pump starvation, loss in injection pressure, and injection percentage variation.

Cleaning of static filters without cleaning the whole system can allow solid matter to pass through the filter and clog the system further down stream. Thus, it is a primary object of the present invention to provide a filtering system for the filtering of injector fluids that improves upon the state of the art.

Another object of the present invention is to provide a filter system that uses the height of flutes on an auger to retain fluid while still transporting solid materials to the end of the filter.

A further object of the present invention is to provide a filtering system that allows a fluid surface of liquid to be continually strained of foam.

Yet a further object of the present invention is to improve the effectiveness of a filtration system.

A further object of the present invention is to provide a filtration system that can be used in filtration applications other than in injection of meat products.

And still yet a further object of the present invention is to provide a filter that can be back-flushed while the machine is running.

These and other objects, feature, or advantages of the present invention will be apparent from the specification and claims.

SUMMARY OF THE INVENTION

The present invention provides a filtering system that has a filter tank and a first rotary filter consisting of a filtering cylinder with an internal auger. In the application of the invention, both the filtering cylinder and the internal auger rotate together. The filter system further comprises a substantially enclosed second rotary filter that receives solid particles filtered from the first rotary filter. A scraper then removes the solid particles from the outside surface of the secondary filter and a pipe takes the filtered liquid from the inside of the secondary filter.

DESCRIPTION OF THE PREFERRED EMBODIMENT

The term fluid, pickle fluid, and liquid are used interchangeably throughout this disclosure and all represent the liquid portion of a liquid and solid suspension. Solid, solid particles, solid material, and meat particles are also used interchangeably throughout this disclosure and represent the solid portion within the liquid of the solid suspension. The terms pickle injection, injector fluid, pickle solution, and suspension are used interchangeably throughout this disclosure and all represent a liquid and solid suspension or mixture.

Figure 1:
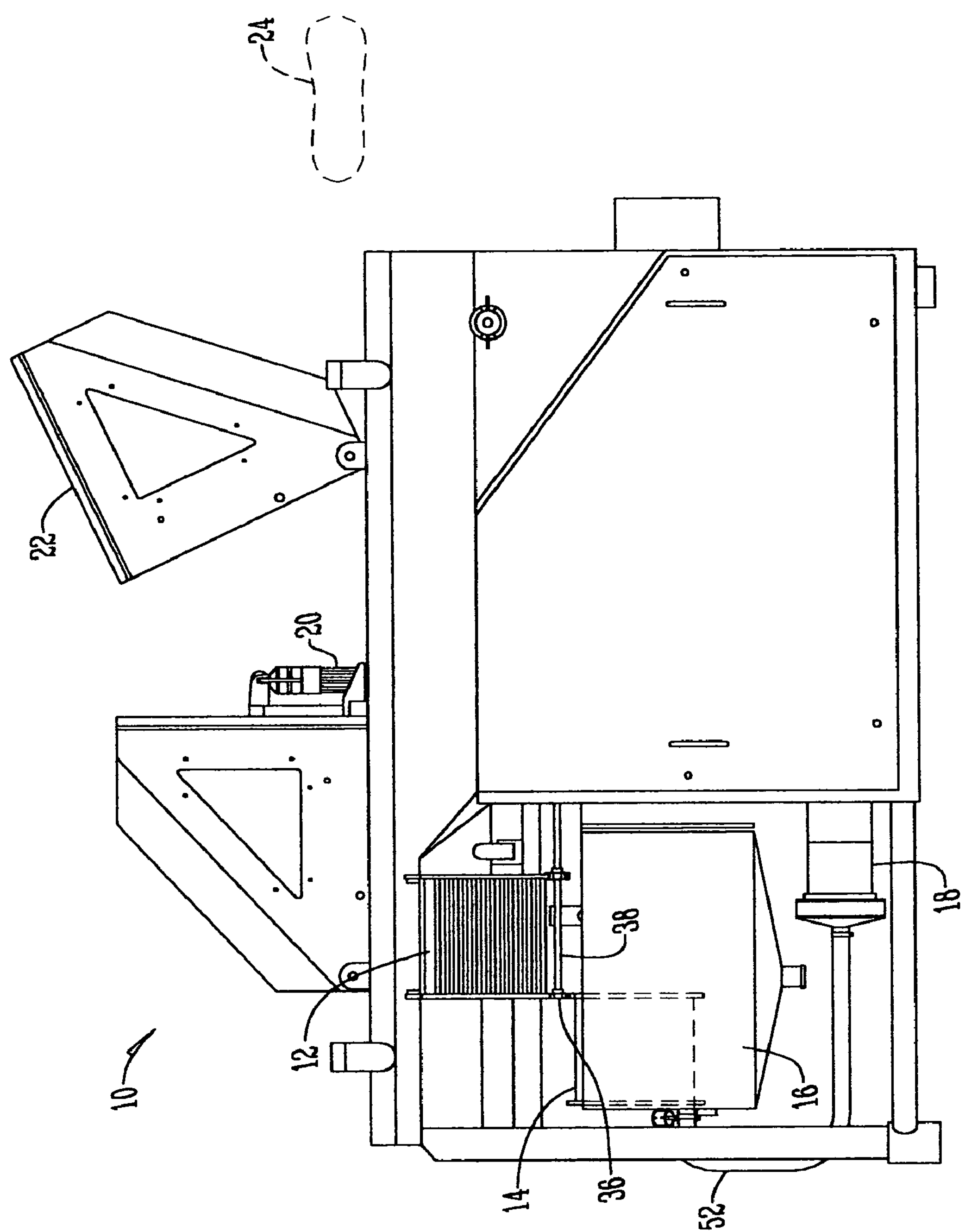
FIG. 1 is a side view of a meat injection machine.

As can be seen in FIG. 1, the filtration system of the current invention can be found in meat injection machine 10. Generally the filter system has a first rotary filter 12, a second rotary filter 14, a tank 16, and a pump 18 that receives the filtered pickle injection from the tank 16 and transports the pickle injection to the injector needles 20. The injector needles 20 are protected by head cover 22 and inject meat product 24 with the filtered pickle injection.

Figure 2:
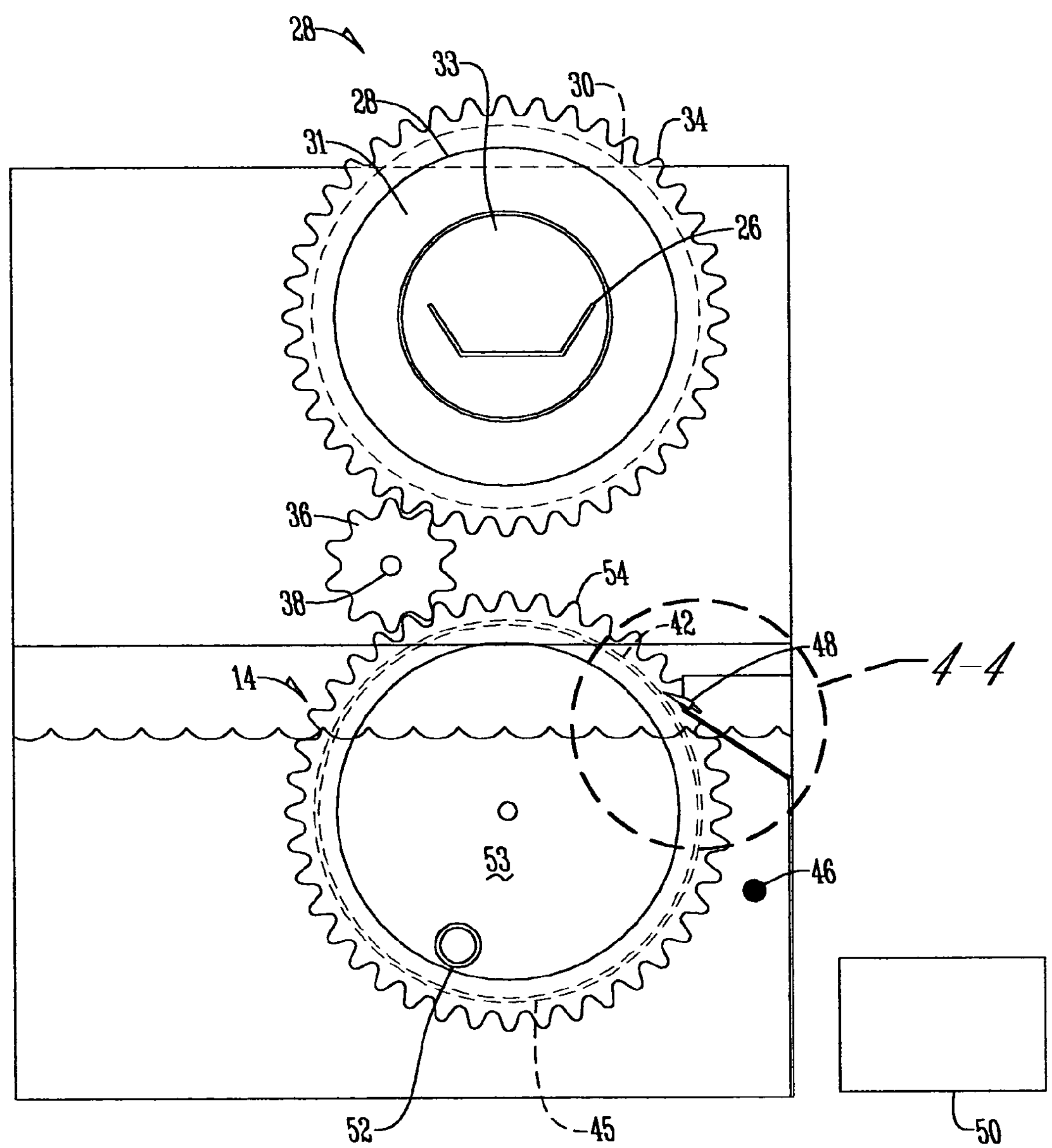
FIG. 2 is a side view of the filtration system of the meat injection machine.
Figure 3:
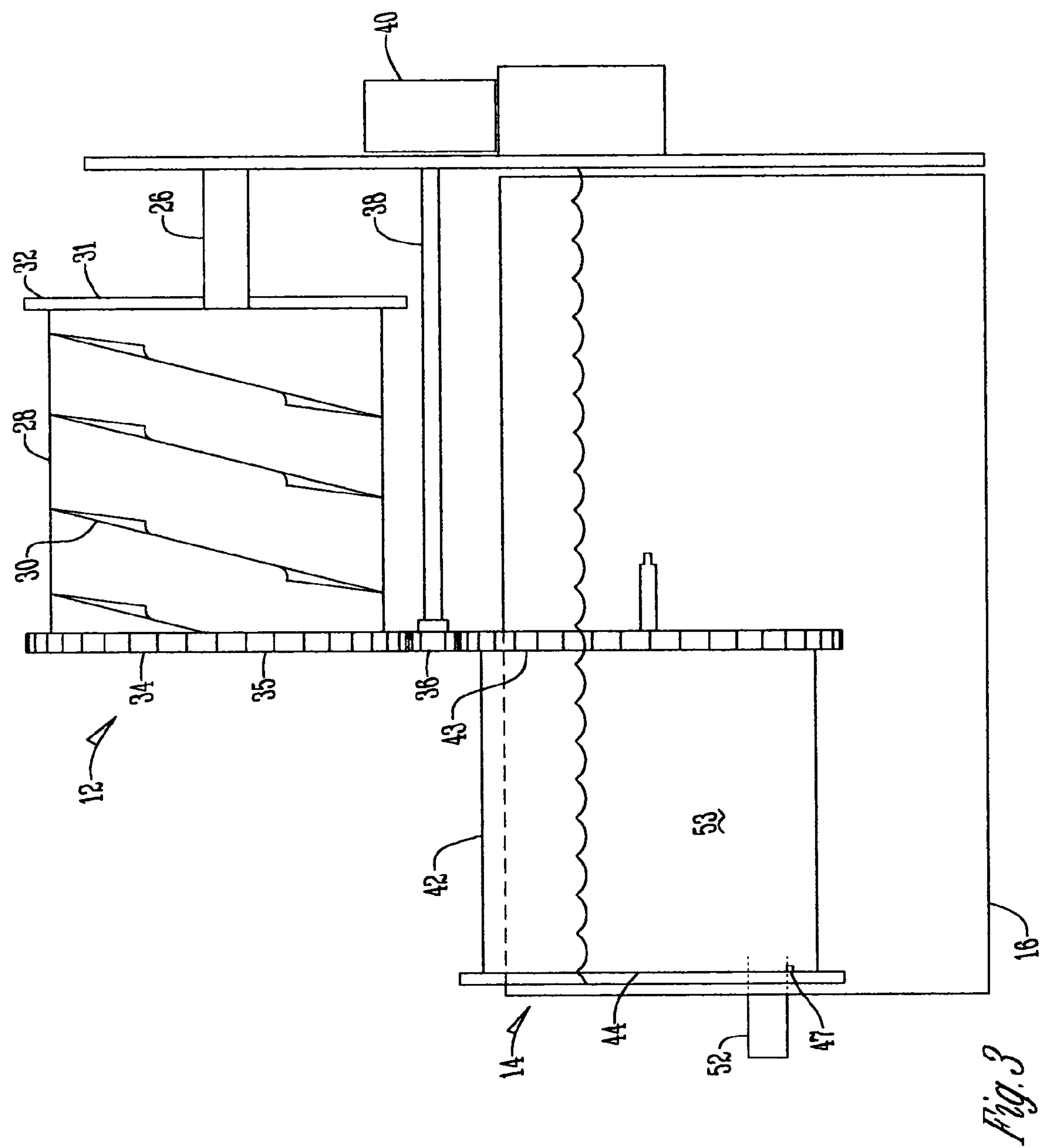
FIG. 3 is a sectional view of the filtering system of the meat injection machine taken from line 4—4 of FIG. 2.
Figure 4:
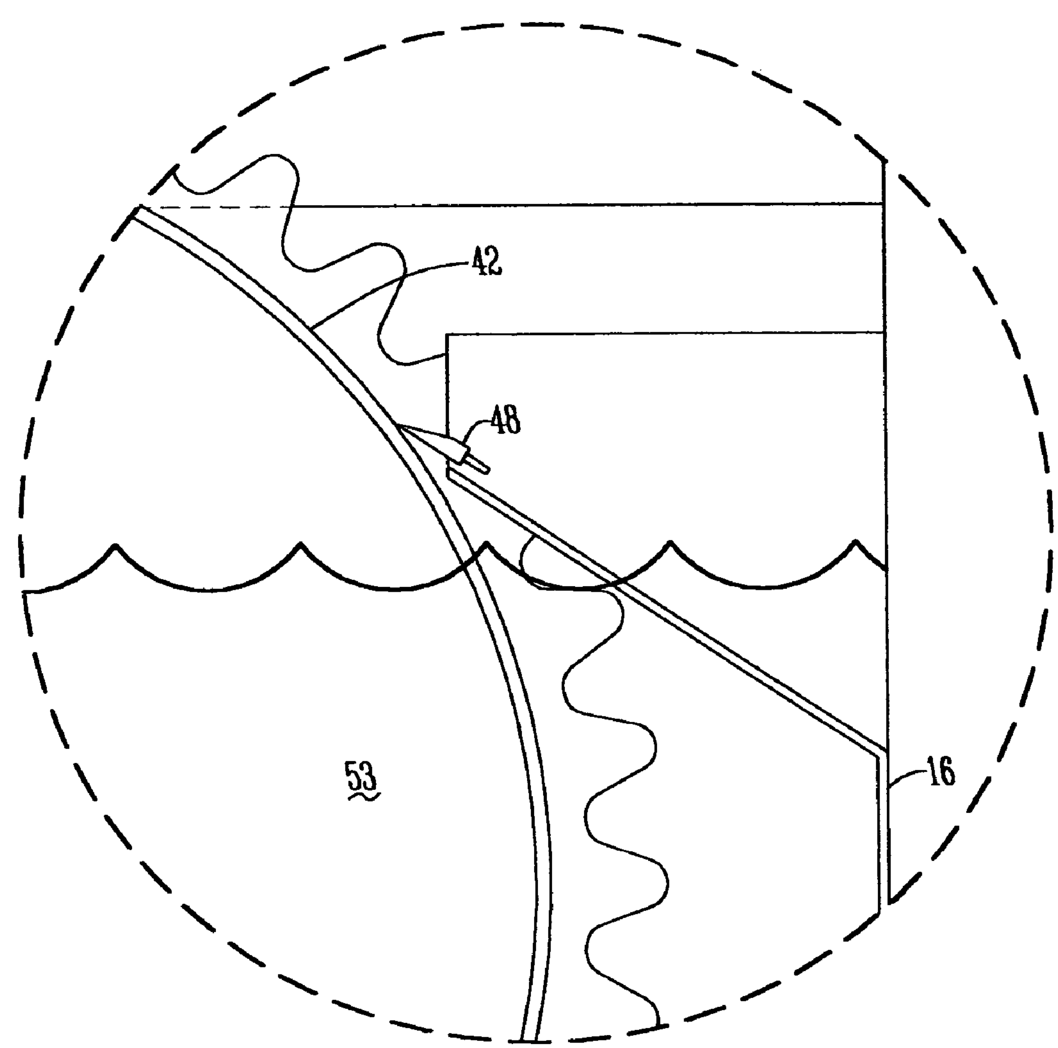
FIG. 4 shows an enlarged side view of the filter system of the meat injection machine showing the scraper.

FIGS. 2–4 show the filtering system of the meat injection machine 10. The filtering system has a chute 26 that brings an unfiltered pickle solution into the first rotary filter 12. The first rotary filter 12 consists of a wedge wire wound cylinder 28 having an auger 30. The auger 30 is attached to an end plate 31 that has a central opening 33 that allows the chute 26 to protrude there through and bayonet slots 32 receive the auger 30 so that the auger 30 fits snuggly within the cylinder 12 and can rotate therewith. Cylinder 28 and auger 30 rotate together and are releasably attached by the quick-release bayonet connection.

Preferably cylinder 28 has a wedge shaped wire with a flat edge on the inside and a uniform gap between wires of 0.5 mm (0.02 inches). For different applications, wires of different sizes and dimensions are used. For example, for optimizing the filtration process the gap between wires is varied. In another application the cylinder 28 is made of material that has holes instead of wedged wire. Also, auger 30 is made with a uniform pitch spiral or a variable pitch depending on the application. Auger 30 also has flutes (not shown in drawings) that are able to retain fluid while still transporting solid material to the end of the cylinder 28, and can be of a height that varies along its length to optimize the filtration of liquid through the filtering cylinder 28 or of a uniform height along its length. The Auger can also have uniform pitch along its length or variable pitch along its length to optimize the filtration of liquid through the filtering cylinder.

A gear 34 is fixed to the second end 35 of first rotary filter 12 and is meshed with a pinion wheel 36 on shaft 38 which is connected to the motor 40 on the meat injection machine 10. In operation the motor rotates the shaft 38 of pinion 36 causing the gear 34 to rotate.

The secondary filter 14 is comprised of a wedge wire wound cylinder 42 having an outer surface 45, a plate 44 that is part of the sidewall of the tank 16 at one end, and a gear 43 at the opposite end that form an interior chamber 53 that is partially submerged in tank 16. Gear 43 is operably connected to pinion wheel 36 so that the pinion wheel 36 operatively rotates both the first rotary filter 12 and the second rotary filter 14. Operably attached to the tank 16 is a scraper 48 used to clean the cylinder 42. Scraper 48 can be a mechanical blade or an air knife. Also attached to the tank 16 is a container 50 for receiving material removed from cylinder 42.

A pipe 52 extends outwardly from the plate 44 and is in communication with the interior chamber 53 of the secondary filter 14. The pipe 52 provides an outlet for the filtered liquid in the interior chamber 53 of the secondary filter 14. Pipe 52 is operably connected to the pump 18 to transport filtered liquid from the interior chamber 53 of the secondary filter 14 to the injection needles 20.

In operation, a pickle fluid having meat particles falls from chute 26 into cylinder 28. Liquid passes through the gaps between the wires of cylinder 28 and drains into tank 16, while the solid particles are transported along the length of cylinder 28 by the rotating auger 30. In one embodiment the auger 30 and filtering cylinder 28 are rotated at different speeds. The solid particles with some excess liquid then falls from the second end 35 of the cylinder 28 onto the outer surface 45 of the second rotary filter 14. As the cylinder 42 rotates, solid particles collect on the wedge wire and are transported to the scraper 48 where the solid particles are deposited into container 50.

As pump 18 draws liquid via pipe 52 from the interior chamber 53 of secondary rotating filter 14 it generates a negative pressure in interior chamber 53. This draws fluid from tank 16 into interior chamber 53 through cylinder 42. Any remaining solids in this fluid are deposited on the outer surface 45 of rotating cylinder 42, which transports them to scraper 48 as it rotates.

Any foam (protein and fat) floating on the surface of fluid in tank 16 is lifted off as cylinder 42 rotates and it too is transported to scraper 48 which removes it and deposits it into container 50. Then pipe 52 transports the filtered liquid from the interior chamber 53 of the cylinder 42 to the injection needles 20. As the pipe 52 transports filtered liquid from the interior chamber 53 of cylinder 42 extra unfiltered liquid is introduced to the tank 16 via the first rotary cylinder 12, replenishing the fluid lost in the system.

In one application the filters are backwashed during the operation of the filtering system. To backwash the first rotary filter 12, an air knife is installed close to the first rotary filter 12. Similarly, the second rotary filter 14 may be backwashed by placing a nozzle within the second rotary filter. Fluid is pumped at high pressure at the interior of the second rotary filter 14 to back flush it and force particles that may be clogging it back into the tank 16.

Thus, a filtering system for the filtering of injector fluids that improves upon the state of the art is disclosed. The filtering system eliminates the need for static filters by using two rotating cylindrical filters. The system also creates a whirlpool effect that allows foam to be continually strained from the surface of the liquid in the tank. This system may be used in a meat pickling process or any other process wherein solid particles are to be filtered out of a liquid. Furthermore, the filters in this system may be back-flushed while the machine in operation. It will be appreciated by those skilled in the art that other various modifications could be made to the device without the parting from the spirit in scope of this invention. All such modifications and changes fall within the scope of the claims and are intended to be covered thereby.

What is claimed is:

1. A filtering system for filtering solid waste comprising:

a first rotary filter having a first elongated filtering cylinder with a first porous outside surface, a first and second end, and an internal auger, said second end having a first gear fixed thereto;

a tank operably connected to the first rotary filter and adapted to receive liquid from the first rotary filter;

a pinion wheel; and a second rotary filter having a second elongated filtering cylinder with a second porous outside surface, and two ends forming an interior chamber, one of said two ends having a second gear fixed thereto, while the other end has an outlet for filtered liquid exiting said interior chamber, said second rotary filter being partially disposed within the tank and adapted to receive solid waste from the first rotary filter;

wherein liquid having particles contained therein is introduced into said first elongated filtering cylinder and the liquid passes through the first porous outside surface, while the solid particles are transported along the length of the cylinder by said internal auger and onto said second rotary filter, said first and second gears being operably connected to said pinion wheel so that the pinion wheel operatively rotates both said first rotary filter and said second rotary filter.

2. The filtering system of claim 1 further comprising a means for removing solid waste from the outside surface of the second rotary filter operably connected to the tank.

3. The filtering system of claim 1 further comprising a pipe in communication with the interior chamber of the second elongated filtering cylinder.

4. The filtering system of claim 3 further comprising injection means fluidly connected to the pipe.

5. The filtering system of claim 2 wherein the means for removing solid waste is a scraper.

6. The filtering system of claim 2 wherein the means for remaining solid waste is an air knife.

7. The filter system of claim 1 further comprising a backwashing means for backwashing the first filter while the system is in operation.

8. The filter system of claim 1 further comprising a backwashing means for backwashing the second filter while the system is in operation.

9. The filter of claim 1 wherein the auger and the first elongated filtering cylinder are operably connected with a bayonet connection.

10. The filtering system of claim 1 wherein the first gear and the second gear are driven at different speeds.

11. The filtering system of claim 1 wherein the first elongated filtering cylinder of the first rotary filter is made of wedge shaped wires wound to leave a consistent gap to allow liquid to pass, but prevent the passing of solids of a predetermined size.

12. The filtering system of claim 1 wherein the first elongated filtering cylinder of the first rotary filter is made of wedge shaped wires wound to leave a gap between wires that varies in a predefined manner along its length to progressively allow increasing sizes of solids to pass through.

13. The filtering system of claim 1 wherein the auger of the first rotary filter is of uniform height along its length.

14. The filtering system of claim 1 wherein the auger of the first rotary filter is of a height that varies along its length to optimize the filtration of liquid through the filtering cylinder.

15. The filtering system of claim 1 wherein the auger of the first rotary filter has a uniform pitch along its length.

16. The filtering system of claim 1 wherein the auger of the first rotary filter has a variable pitch along its length to optimize the filtration of liquid through the filtering cylinder.

* * * * *